Dec. 10, 1929.  P. J. DUNCAN  1,738,766
APPARATUS FOR DEPHLEGMATION
Filed May 16, 1927  2 Sheets-Sheet 1
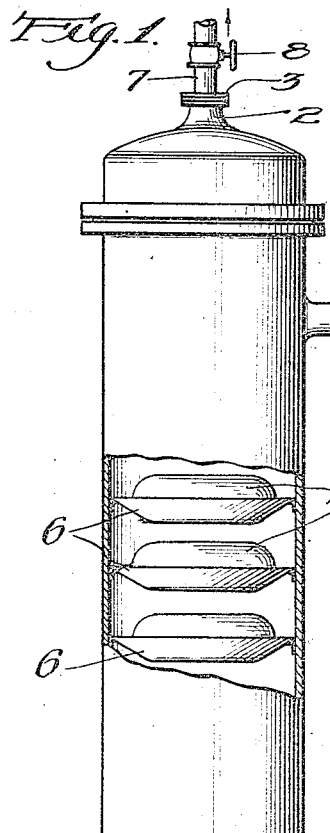
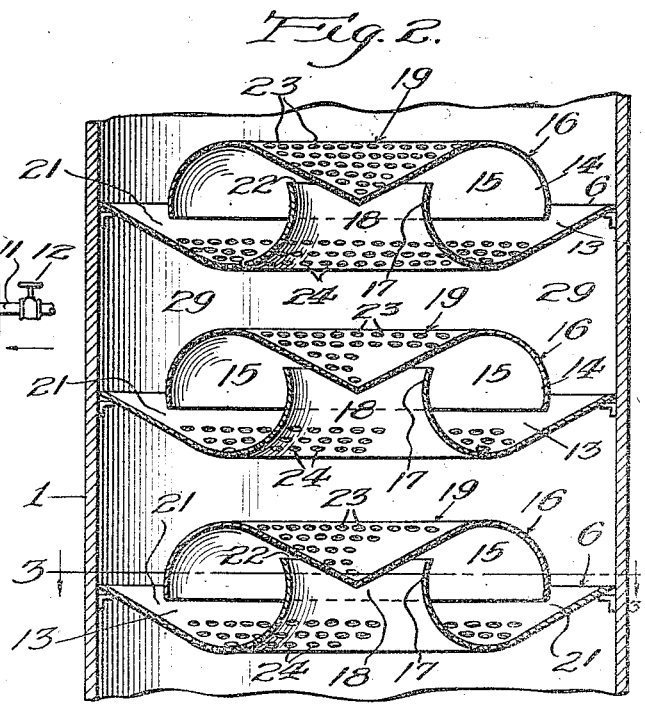
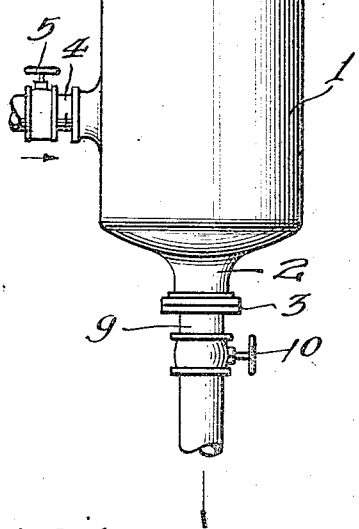
Witness:
Stephen H. Rebora
Inventor:
Paul J. Duncan
by Frank L. Belknap
Atty.

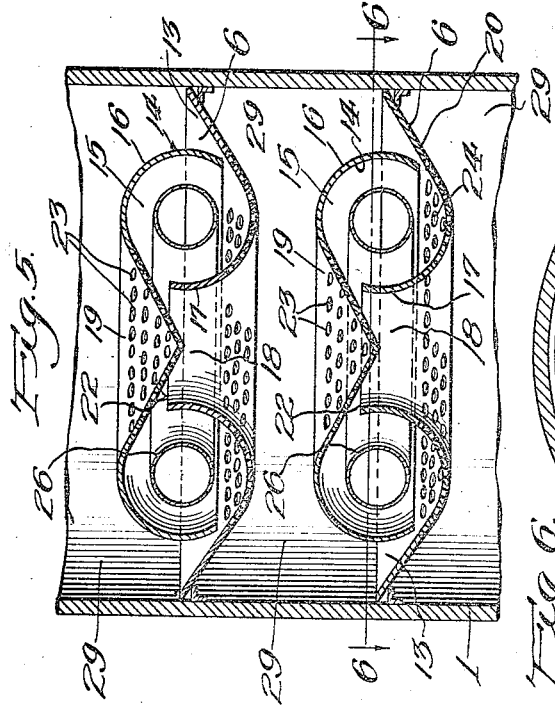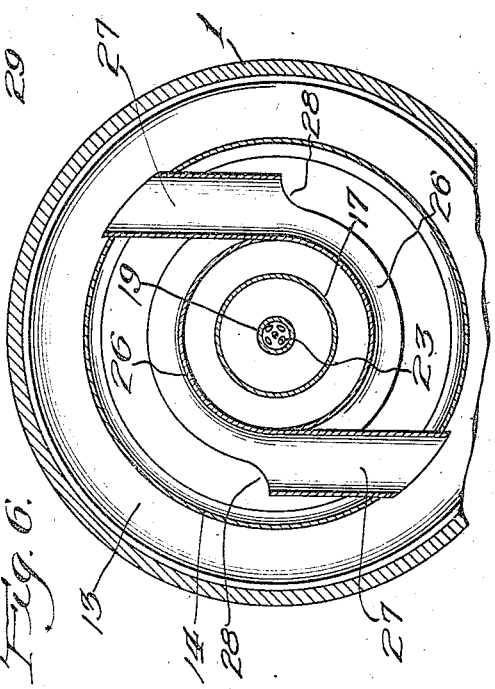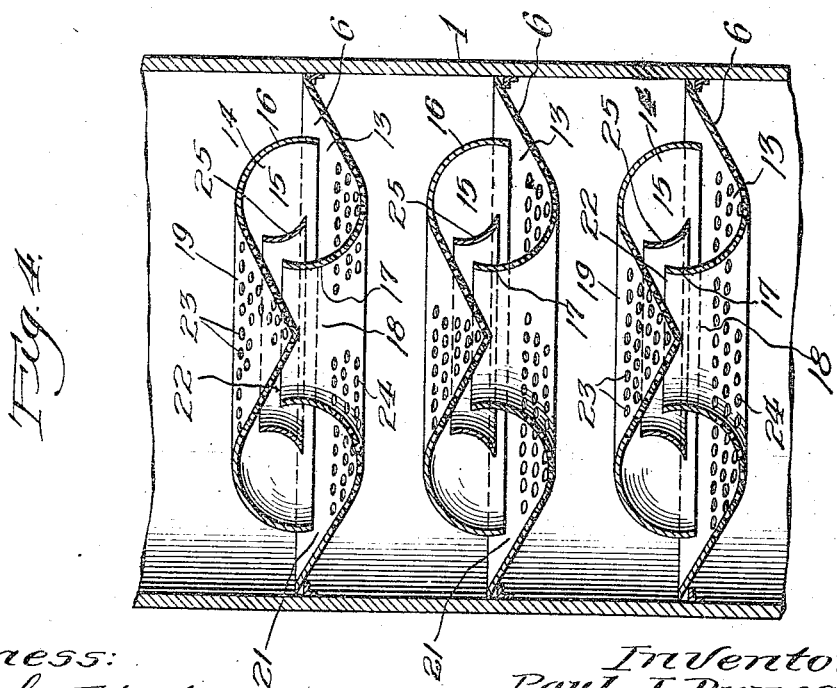

Patented Dec. 10, 1929

1,738,766

UNITED STATES PATENT OFFICE

PAUL J. DUNCAN, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR DEPHLEGMATION

Application filed May 16, 1927. Serial No. 191,644.

The present improvements relate to apparatus for dephlegmation, and refer more particularly to the fractionation of vapors having different characteristics or boiling points for the purpose of separating those not of the desired characteristics from those of the desired characteristics.

The invention is particularly applicable to the fractionation of hydrocarbon oil vapors produced in the distillation or cracking of hydrocarbon oil under atmospheric pressure, subatmospheric pressure or superatmospheric pressure. But it is to be understood that the broad concept of the invention contemplates fractionation of vapors produced from the heating of liquids other than hydrocarbon oil, such, for instance, as alcohol and the like.

It is an object of the present invention to cause the vapors and liquids to be brought into intimate contact in separate steps, stages or zones throughout the height of a fractionating tower, said intimate contact in each step taking the form of a circulation having a ring-like whirling motion, and which greatly increases the contact and the intermingling and scrubbing between vapors and liquid. It is a further object of the invention to provide a novel means for producing such motion.

In the fractionation of vapors, and more particularly cracked hydrocarbon oil vapors, it has been found that it is advantageous to secure as intimate a contact between vapors and liquid as is possible in separate steps or stages throughout the height of a fractionating tower, while maintaining conditions of equilibrium between vapors and liquid in each stage and at the same time maintaining pools of liquid in the separate stages whereby the time element has a decided effect upon the efficiency of the dephlegmation.

The present invention is particularly designed to accomplish these objects and bring about the advantages discussed above without at the same time bubbling the vapors through the pools of liquid.

The utility of the invention as well as other objects and advantages will be more particularly apparent from the following description:

In the drawings, Fig. 1 is a diagrammatic elevational view, with certain parts in vertical section, of a fractionating tower equipped to carry out the objects of the present invention.

Fig. 2 is an enlarged vertical sectional view illustrating in detail the fractionating elements.

Fig. 3 is a transverse sectional view taken on line 3—3 of Fig. 2.

Fig. 4 is an enlarged vertical sectional view similar to Fig. 2 of a modified form of fractionating element.

Fig. 5 is a similar view of another modified form of fractionating element.

Fig. 6 is a transverse sectional view taken on line 6—6 of Fig. 5.

Referring more in detail to the drawings, and particularly Fig. 1, 1 designates an elongated vertically disposed metal shell provided with upper and lower manholes 2 adapted to be closed by means of the movable flanges 3. Vapors which are to be subjected to fractionation in the tower 1 may be directed thereto through the inlet line 4 controlled by valve 5, said vapors ascending through the tower and being acted upon in their ascent by means of the fractionating elements 6, which will be more particularly hereinafter described. In passing through these fractionating elements 6 the vapors are fractionated and reflux condensate is formed which flows downwardly accumulating in the bottom of the tower. The vapors which remain uncondensed after passage through the dephlegmator pass out of the top thereof through the vapor outlet line 7 in which may be interposed a throttle valve 8, while the reflux condensate accumulating in the bottom of the tower 1 may be withdrawn, for instance, through the reflux condensate draw-off line 9, in which may be interposed valve 10. Said reflux condensate may be diverted to storage or returned for treatment. The vapors which pass out through vapor outlet line 7 can be retreated or condensed and collected. Additional cooling of the vapors taken from the top of the tower 1 may be obtained by injecting into the upper portion of the tower cooling liquid through inlet line 11, in which may be interposed valve 12.

Referring back to the fractionating element 6, three various forms are shown in Figs. 2 to 6, both inclusive. It is to be understood that while I have shown three different forms to accomplish the object of the invention any other form of element in which the vapors and liquid are caused to circulate with a whirling ring-like circular motion at each step in the dephlegmator can be provided within the scope of the invention.

Referring to the form of element shown in Figs. 2 and 3, each element 6 may comprise two trays or baffles 13 and 14, of such form as to provide an annular ring-like space 15, the walls of said space being defined in the upper portion thereof by the downwardly curved outer edge 16 of the upper baffle 14, and the lower section of which space 15 may be formed by the upwardly projecting inner edge 17 of the lower pan 13. The portions 16 and 17 of the trays 14 and 13, respectively, together form the annular ring shaped space when properly positioned relative to each other. The form of this ring-like space 15 between the two trays 13 and 14 may be better understood if it is compared to a doughnut.

The center portion of the tray 13 enclosed by the upwardly projecting portion 17 is hollow and forms an annular opening 18. The center portion of the tray 14 may take the form of an inverted cone 19, the outer portion of which has been shaped at 16 to form a portion of the wall of the annular hollow ring 15. The tray 13 is connected to the wall of the dephlegmator 1 in any suitable manner, the outer edge of said tray being preferably upwardly inclined from the center to the wall of the tower. The outside circumference of the upper tray 14 is less than the inside circumference of the dephlegmator wall.

The outer edge of the annular ring-like section 16 of the upper tray 14 terminates short of the lower tray 13 forming a circular opening between the upper and lower baffles, designated 21. The inner edge of the upwardly projecting portions 17 of the lower baffle 13 also terminates short of the inverted conical portion 19 of the upper baffle 14, forming a circular opening designated 22 between trays 13 and 14. The conical portion 19 of the upper tray 14 may be provided with apertures or perforations 23, and the lower portion of the circular tray 13 may be provided also with similar perforations 24. The area of the perforations in the trays may preferably be such that no vapors are permitted to enter or escape the ring-like space 15 except through the openings 22 and 21, being prevented from doing so by an appreciable liquid head maintained over the perforations 23 and 24. It is to be noted, however, that the relative positions of the pans 13 and 14 and the size of the perforations on the lower tray 13 are such that the level of the condensate maintained over the perforations 24 in tray 13 does not rise above the lower edge of the upper tray 14.

The arrangement of elements within the tower 1 provides an enlarged space 29 adjacent to the wall of the tower and between the elements 6.

The operation may be described as follows: Vapors entering the tower through line 4 enter the lowermost element 6 through the center opening 18 of the lower tray 13. They pass then through the ring-like opening 22 which is of relatively small area whereby the velocity of the vapors is greatly increased at this point. The vapors are then caused by this increased velocity to circulate in an annular ring-like whirling motion in the space 15, being directed in this motion by the imperforate portion 16 of the upper tray 14 and by portion 17 of the lower tray 13. During this circular whirling motion in space 15 the lighter fractions tend to separate from the heavier fractions through the action of centrifugal force there exerted. A portion of the vapors may be continuously withdrawn from the ring-like space 15 through the annular opening 21 between the lower edge of the upper tray and the lower tray 13. Vapors issuing from the whirling ring ascend through the vapor space 29 to the element 6 thereabove where the same action is repeated.

Portions of the heavier fractions of the vapors which condense as reflux in one element descend to the element below, a portion of said reflux collecting in the central conical shaped portion of the cone 19, and another portion of said reflux flowing in the form of a film over the curved portion 16 of said upper tray. Reflux which flows toward the apex of the cone 19 of the upper tray rains in finely divided streams through the perforations 23, thence coming in contact with the vapors rising from the elements below and entering the element described. The streams of finely divided condensate are then drawn with the whirling vapors into the ring-like space 15 and the action therein causes a very intimate contact and scrubbing between the liquid and vapors, and also condensed impact of vapor molecules and liquid molecules against the imperforate walls of the ring-like space 15 all of which results in a greatly improved fractionation. The condensate which separates from the vapors in space 15 due to centrifugal force collects in the bottom of the circular pan-like lower tray 13 raining downwardly in finely divided condition through the perforations 24.

The operation of the tower has been described in relation to one element 6. It is to be understood that the operation of the other elements above and below is similar.

It is also to be noted that I may provide any number of elements 6 as may be desired throughout the height of the tower and that they may comprise either the sole fractionating means or one of a number of different fractionating means.

As one of the features of the invention, the whirling motion of the vapors and reflux condensate follows radial planes throughout the tower—that is to say, the portion of the vapors and reflux condensate in each hollow ring 15 will describe circles which are situated radially to the center of the tower and in planes substantially parallel to the general direction of the passage of vapors through the tower. The whirling vapors and liquid in each step will form a closed ring within the annular space 15 of each individual element 6 comparable to a smoke ring, the whirling motion being established and maintained by the velocity of the vapors entering the annular ring-like space 15 through the opening 22.

I am well aware that it has been attempted to improve the fractionation in dephlegmator towers by causing vapors and condensate to circulate in a helical path throughout the tower in order to get the benefit of the action of centrifugal force, but I have observed that, at times, this unbroken helical path does not provide for the agitation and scrubbing between vapors and liquid which is necessary to secure efficient fractionation, and this is particularly true when the vapors being treated comprise cracked hydrocarbon oil vapors which consist of very closely progressing boiling point fractions. These disadvantages are overcome by the method of fractionation herein set forth.

As another feature of the invention, I secure the benefit of the whirling motion and centrifugal force in a series of steps whereby the vapors are alternately subjected to a whirling motion in a zone of agitation and scrubbing 15, and straight ascending or descending motion in a relatively quiet zone 29. In this manner I secure in the agitating zone 15 an intimate scrubbing between the liquid and vapors and formation of reflux, and promote separation of the uncondensed fractions by means of centrifugal force. The quiet zone 29 provided between two agitating zones 15 permits any liquid entrained in the vapors to drop therefrom thus preventing objectionable priming.

As a further feature of my invention, I provide for a positive means of separating entrained liquid from vapors in each step. The portion of the reflux dropping from an element above onto the curved portion 16 of the upper tray 14 falls onto the outer edge of the lower tray 13 as a continuous circular curtain over the ring-like opening 21, whereby vapors which are being removed from the whirling zone 15 through opening 21 are further scrubbed in their passage through this liquid film. Any entrained liquid particles are dropped out of the vapors in the quiet zone 29 between the element 6.

Referring to Fig. 4, I have shown therein a slightly modified form of element 6 which utilizes the principle of the invention. The element shown in Fig. 4 comprises the same parts as those illustrated in Figs. 2 and 3, the same reference characters being applied thereto. In addition, to improve the circulation of the vapors in the whirling ring-like space 15 I have provided for an annular injector nozzle 25 which may be installed inside the hollow ring 15 at or near the vapor entrance 22 to further increase the velocity of the vapors entering the ring, and also create a positive means of directing the vapors and condensate already in the ring to mix with the fresh vapors entering therein.

It is to be noted that in the zone of centrifugal action designated 15 in the designs shown in Figs. 2, 3 and 4, the vapors are withdrawn from the annular ring portion at the outer rim thereof which may, in some instances, cause substantial proportions of liquid to be entrained with the vapors. This liquid, as has been described, drops out in the quiet zone 29 between the element 6.

In some instances it may be desirable to improve the efficiency of the design, particularly as related to the sizes of the elements and to the tower as a whole, by providing means for withdrawing vapors from the whirling centrifugal zone 15 at the point where the vapors are relatively more free from the liquid; that is to say, from a circle determined by the center of each radial section of the annular ring 15. In this manner the vapors are freed from the liquid before being withdrawn from the ring and the quiet zone 29 provided between the pans may be thereby considerably diminished in area. An arrangement to carry out this alternate method is illustrated in Figs. 5 and 6, where the parts illustrated in Fig. 2 and described in connection therewith are designated by the same numerals. As a modification in the design illustrated in Figs. 5 and 6, the outside edge of the upper tray 14 of each element terminates at a shorter distance from the lower tray 13 of this element than has been heretofore described, such area between the two trays of the element being sufficient only to permit the reflux accumulating at the outer portion of the lower tray to pass downward into the perforated portion of said tray and from there flowing down to the element below.

As another feature of the modification shown in Figs. 5 and 6, I provide for means to remove vapors from the zone of the ring-like portion 15 where the vapors are substantially free from liquid, that is to say, from the center of the zone. The means provided therefor may comprise a circular pipe 26 positioned concentric relative to the curved portions 17 and 16, respectively, which pipe is provided with extensions 27 adapted to project through the walls 16 of the tray 14 into the outer zone 29 between said tray 14 and the wall of the tower. A portion of the pipe 26 may be cut away, as shown at 28, to provide an opening through which the vapors may be drawn from the hollow ring 15 into the pipes 27 and out to the next element.

From the foregoing it will be apparent that I have devised a very efficient form of dephlegmator tower of the intimate contact type. There are no liquid seals at any point in the tower so that an unbalanced pressure caused by the sudden vaporization of a relatively large quantity of cooling liquid at the top of the tower cannot cause the liquid to siphon downward.

While I have shown and described trays or elements each comprising a pair of baffles 13 and 14 occupying the entire cross-section of the tower, it is understood that each tray may comprise a plurality of juxtaposed elements 6 each comprising trays 13 and 14, within the concept of the invention.

I claim as my invention:

1. A dephlegmator comprising a shell and vapor inlet and outlet, sets of transversely curved baffles mounted therein each set being spaced from another and the baffles of each set being spaced from each other, one baffle of a set being curved oppositely to an adjacent baffle of that set thereby forming rings having inlet and outlet, said baffles having intermediate perforated areas through which descending liquid drops to the baffle below.

2. A dephlegmator comprising a shell and vapor inlet and outlet, sets of transversely curved baffles mounted therein each set being spaced from another and the baffles of each set being spaced from each other, one baffle of a set being curved oppositely to an adjacent baffle of that set thereby forming rings having inlet and outlet, said baffles having intermediate perforated areas through which descending liquid drops to the baffle below, the lower baffle of a set having a central opening through which vapors enter the ring, the outer edge of the upper baffle being spaced away from the surface of the lower baffle to form a vapor outlet.

In testimony whereof I affix my signature.

PAUL J. DUNCAN.